United States Patent [19]

Ihle et al.

[11] Patent Number: 5,435,532
[45] Date of Patent: Jul. 25, 1995

[54] ELASTIC SUSPENSION FOR ATTACHING DYNAMICALLY STRESSED FUNCTION PARTS

[75] Inventors: Erich Ihle; Bernhard Lindenmayer, both of Wadern, Germany

[73] Assignee: Saar-Gummiwerk GmbH, Wadern-Büschfeld, Germany

[21] Appl. No.: 254,436

[22] Filed: Jun. 6, 1994

Related U.S. Application Data

[63] Continuation of Ser. No. 41,988, Apr. 2, 1993, abandoned.

[30] Foreign Application Priority Data

Apr. 4, 1992 [DE] Germany .............. 42 11 397.0

[51] Int. Cl.$^6$ .............. B60K 13/04; F16L 3/16
[52] U.S. Cl. .............. 267/153; 267/141; 267/292; 267/140.4
[58] Field of Search .............. 267/153, 273, 276, 279, 267/154, 141, 292, 293, 294, 259, 30, 140.4, 152, 151, 81, 83, 164, 165; 248/610, 613, 612, 636, 562, 58–60, 632, 619, 621; 285/61, 62; 181/207–209; 180/300, 312, 912; 123/192.1

[56] References Cited

U.S. PATENT DOCUMENTS

| | | | |
|---|---|---|---|
| 2,510,963 | 6/1950 | Dibblee | 267/140.4 |
| 2,612,370 | 9/1952 | Eger | 267/140.4 X |
| 3,292,887 | 12/1966 | Cassel et al. | 248/610 X |
| 4,086,977 | 5/1978 | Heiland et al. | 248/610 X |
| 4,380,324 | 4/1983 | Woesler | 248/610 |
| 4,494,722 | 1/1985 | Kanai et al. | 248/621 |
| 4,660,797 | 4/1987 | Tonnier | 267/279 X |
| 4,727,957 | 3/1988 | Fujita | 267/292 X |
| 4,817,909 | 4/1989 | Deane | 248/60 X |
| 4,884,779 | 12/1989 | Drabing et al. | 268/610 |
| 4,893,595 | 1/1990 | Mertens | 267/292 X |
| 4,893,778 | 1/1990 | Drabing et al. | 248/610 |
| 5,050,837 | 9/1991 | Hamada et al. | 248/610 |
| 5,102,107 | 4/1992 | Simon et al. | 267/30 X |
| 5,271,595 | 12/1993 | Simon et al. | 248/60 X |

FOREIGN PATENT DOCUMENTS

| | | |
|---|---|---|
| 3445491 | 4/1986 | Germany . |
| 4035728 | 5/1992 | Germany . |
| 4211397 | 9/1993 | Germany . |

Primary Examiner—Douglas C. Butler
Attorney, Agent, or Firm—James Creighton Wray

[57] ABSTRACT

The invention relates to an elastic suspension for attaching dynamically stressed function parts, consisting of a metal retaining clip attached to a base plate, and a receptacle case that is positioned by way of links of a rubber-elastic material in a swinging manner within a section formed by the base plate and the retaining clip. The retaining clip consists of an elastic metal band that permits a level deformation of the retaining clip. The retaining clip of the elastic metal band no longer functions exclusively as a loss protector, but rather absorbs an essential part of the dynamic stresses itself. The deformation in the horizontal axis, i.e. the axis that is parallel to the base plate, is adaptable to the respective requirements by a suitable selection of elasticity and thickness of the metal band, as well as the starting geometry of the retaining clip in accordance with the elasticity and geometry of the rubber-elastic links, which significantly reduces the displacement paths that must be absorbed by the rubber-elastic links. The links thus may be designed shorter, so that the overall dimensions of the suspension can be reduced. The elasticity and geometry of the retaining clip are designed in such a way that up to 90% of the displacement path of the receptacle cases are absorbed by the elastic retaining clip. Because the tensile and pressure stresses to be absorbed are correspondingly reduced, the expensive silicon caoutchouc can be replaced with cheaper material such as HPMD.

3 Claims, 1 Drawing Sheet

ELASTIC SUSPENSION FOR ATTACHING DYNAMICALLY STRESSED FUNCTION PARTS

This application is a continuation of application Ser. No. 08/041,988 filed Apr. 2, 1993, now abandoned.

The invention relates to an elastic suspension for attaching dynamically stressed function parts, consisting of a metal retaining clip attached to a base plate, and a receptacle case that is positioned by way of links of a rubber-elastic material in a swinging manner within a section formed by base plate and retaining clip.

Such elastic suspensions are known e.g. from DE-C-34 54 491. They are used in automobile engineering for positioning exhaust systems and catalyzers. The suspension itself is attached rigidly with its base plate to the vehicle bottom, while the coupling of the exhaust pipe or catalyzer is realized via suitable connection elements, such as bolts or screws, that are positioned in the receptacle case. The dynamic stresses from the connected function part acting on the receptacle case are absorbed by the rubber-elastic links that carry the receptacle case. The retaining clip that consists of rigid metal band material acts as a so-called loss protector, in order to prevent a falling of the connected function part in the case of link breaks.

In order to permit the necessary deformation paths, the links must be designed sufficiently long. The high tensile and pressure stresses that occur due to the dynamic stresses also require very thick link diameters. This results in relatively large overall dimensions for the suspension. The high dynamic stresses in connection with high thermal stress also require use of a high-quality, expensive material, such as silicon caoutchouc.

The invention is based on the task of improving an elastic suspension of the initially mentioned type in such a way that smaller dimensions and lower weight are achieved without adversely affecting functionality and life span.

According to the invention, this task is solved in that the retaining clip consists of an elastic metal band material that permits a level deformation of the retaining clip.

The retaining clip of the elastic matal band, e.g. a spring steel band, thus no longer functions exclusively as a so-called loss protector, but rather absorbs an essential part of the dynamic stresses itself now. The deformation in the horizontal axis, i.e. the axis that is parallel to the base plate, in which the largest possible displacement paths are desired, may then be adapted to the respective requirements by a suitable selection of elasticity and thickness of the metal band, as well as the starting geometry of the retaining clip in accordance with the elasticity and geometry of the rubber-elastic links.

The elastic construction of the retaining clip according to the invention significantly reduces the displacement paths that must be absorbed by the rubber-elastic links. The links thus may be designed shorter, so that the overall dimensions of the suspension can be reduced.

According to another characteristic of the invention, elastically and geometry of the retaining clip are designed in such a way that up to 90%, preferably 50–70% of the displacement path of the receptacle cases are absorbed by the elastic retaining clip. The local extensions of the rubber-elastic links can be reduced to extension values to below 50%. Because the tensile and pressure stresses that must be absorbed are correspondingly reduced, it is now possible, even in the case of high temperatures, to use in place of an expensive material, such as silicon caoutchouc, a much cheaper link material, such as HPDM.

Elastically and starting geometry of the retaining clip also may also be adapted to the elasticity and starting geometry of the rubber-elastic links in such a way that the swinging path required in the same plane, but at any angle to the base plate, is also partially absorbed by a level deformation of the retaining clip.

The invention is described in more detail below, using the embodiment illustrated in FIGS. 1 to 2.

Figure 1:
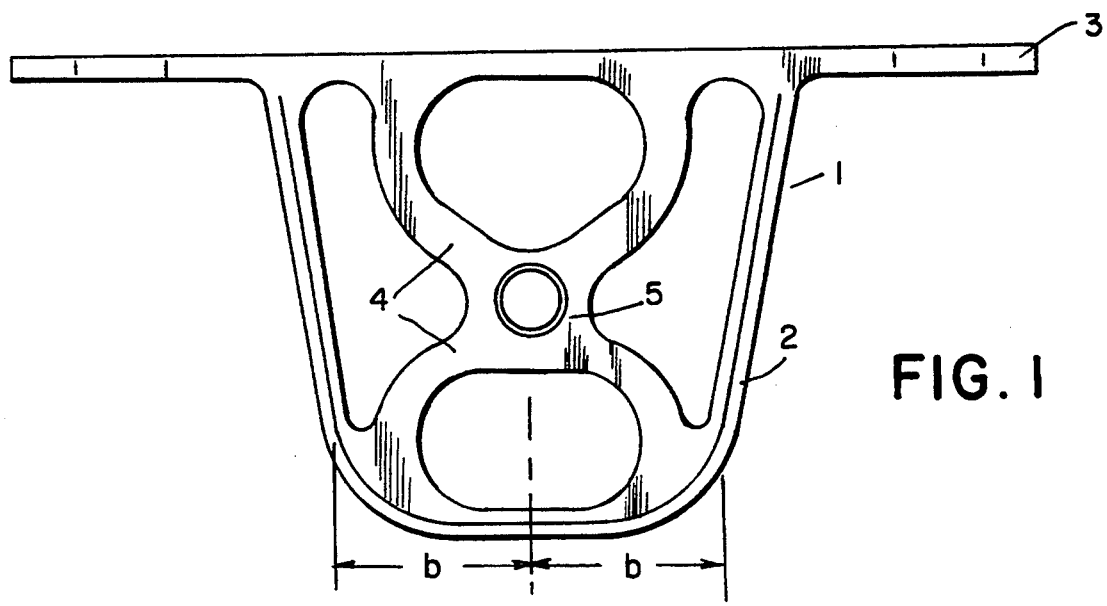
FIG. 1 shows an elastic suspension according to the invention unstressed.

An elastic suspension 1 consists of a base plate 3 with a retaining clip 2 that is attached to the base plate 3. Base plate 3 and retaining clip 2 enclose a section that is, in the shown example, essentially rectangular or trapeze-shaped, and in whose symmetry plane a receptacle case 5 is positioned in a swinging manner by way of links 4 of a rubber-elastic material that are connected to the base plate 3 or the retaining clip 2. The receptacle case 5 is used to connect a dynamically stressed function part. Base plate 3, retaining clip 2, and receptacle case 5 consist of metal. To protect against corrosion, they may be coated with the same material that is used to make the links 4.

According to the invention, the retaining clip is made from elastic metal band material, e.g. spring steel band, so that it absorbs an essential part of the displacement path of the receptacle case 5 during dynamic stressing.

Figure 2:
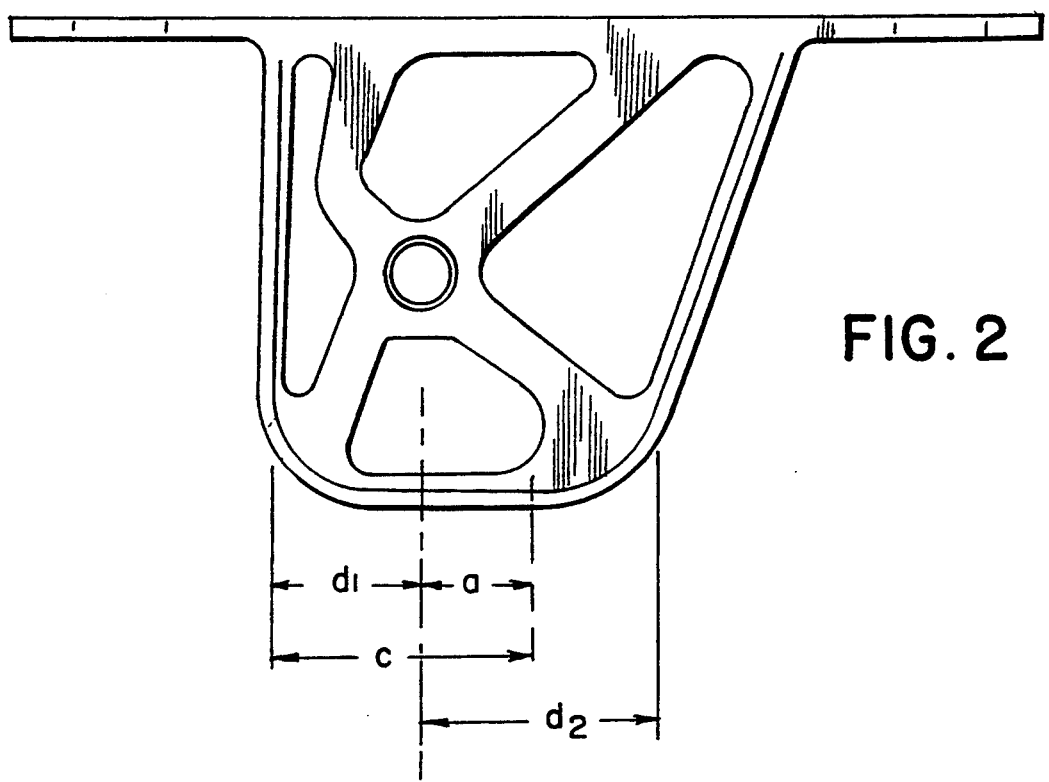
FIG. 2 shows an elastic suspension according to the invention, under horizontal stress.

FIG. 1 shows unstressed suspension 1 with symmetric position of the receptacle case 5 with equal lateral distances b to the retaining clip 2. FIG. 2 in contrast shows the suspension with horizontal displacement a of the receptacle case 2, which causes both the elastic retaining clip 2 and the rubber elastic links 4 to be displaced or deformed.

The left, lateral distance d1 of receptacle case 5 to the retaining clip 2 is greater (d1>b−a), and the right, lateral distance d2 is smaller (d2<b+a) than would be the case with a suspension 1 with rigid retaining clip 2. The stress on the links 4 is reduced by this difference.

We claim:

1. An elastic suspension apparatus for suspending dynamically stressed function parts, comprising a base plate, a flexible retaining clip attached to the base plate, a receptacle case movably positioned within a section formed by the base plate and the retaining clip, plural short-length links for attaching the receptacle case to the retaining clip, the links being formed of rubber-elastic material for imparting a swinging movement, wherein the retaining clip comprises elastic metal and material having an elasticity and starting geometry similar to an elasticity and starting geometry of the links for allowing a level deformation of the retaining clip and for absorbing stresses of the dynamically stressed function parts, wherein the elasticity and starting geometry of the retaining clip and of the rubber-elastic links is such that a swinging path in a same plane and at any angle to the base plate, is partially absorbed by a level deformation of the retaining clip.

2. The apparatus of claim 1, wherein the elasticity and starting geometry of the retaining clip and the links is such that up to 90% of a swinging path of the receptacle case parallel to the base plate is absorbed by a level deformation of the retaining clip.

3. The apparatus of claim 2, wherein between 50% and 70% of the swinging path of the receptacle case parallel to the base plate is absorbed by the level deformation of the retaining clip.

* * * * *